Aug. 1, 1961 J. FUGLESANG 2,994,817
TUBE FAILURE DETECTION CIRCUIT
Filed March 27, 1958
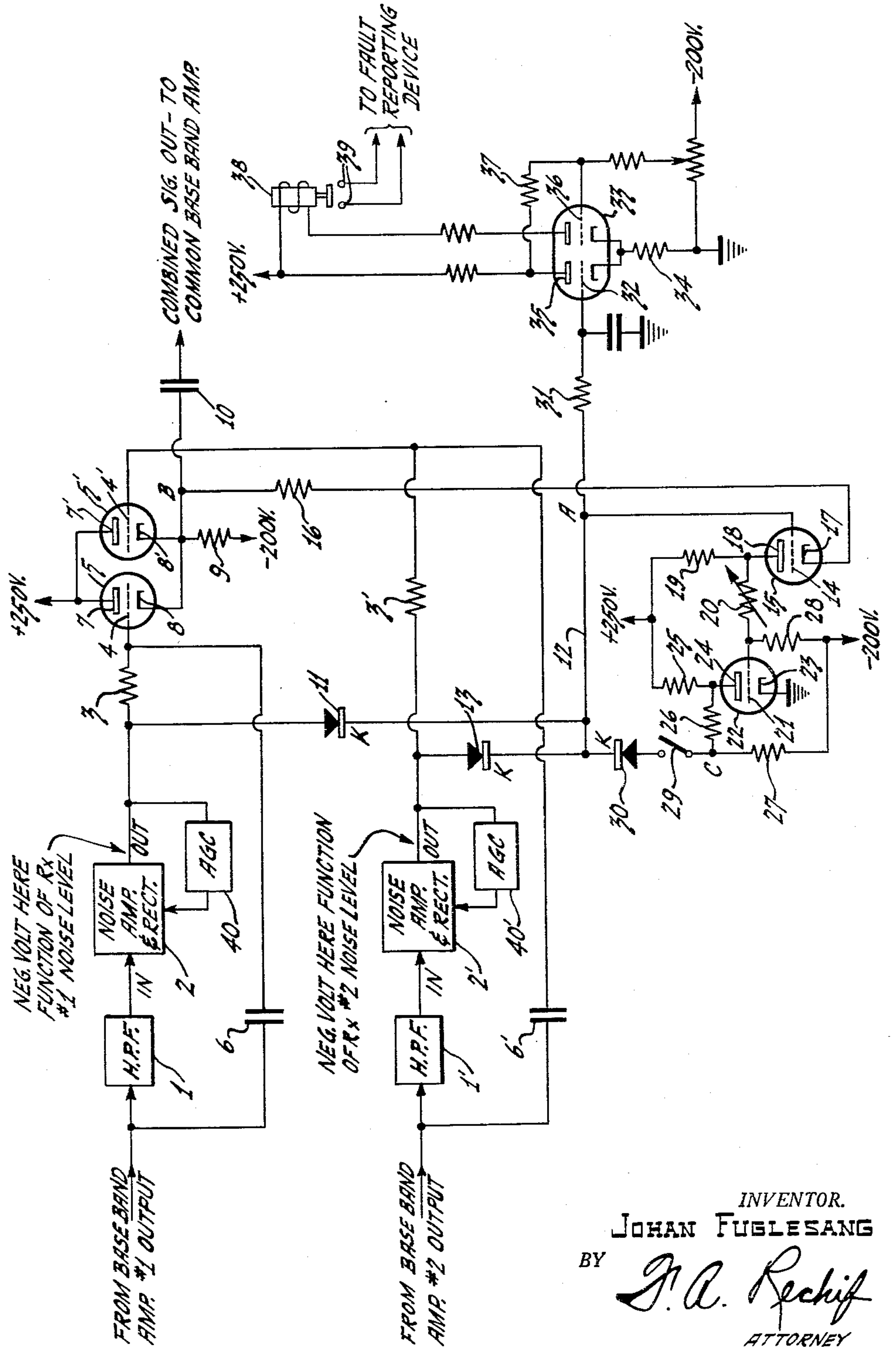
INVENTOR.
JOHAN FUGLESANG
BY F. A. Rechif
ATTORNEY United States Patent Office 2,994,817

Patented Aug. 1, 1961

2,994,817

TUBE FAILURE DETECTION CIRCUIT

Johan Fuglesang, Dorval, Quebec, Canada, assignor to Radio Corporation of America, a corporation of Delaware Filed Mar. 27, 1958, Ser. No. 724,368
24 Claims. (Cl. 324—25)

This invention relates to a circuit arrangement for detecting and automatically reporting failures in tubes, and more particularly in intermittently operated tubes, such as the combiner tubes in signal combiners for diversity receiving systems.

In a certain type of diversity receiving system, two diversity signals, which are equal in information content but uncorrelated in noise content, are added or combined in such a way as to yield one signal which is equal to or lower in noise content than that one of the incoming signals which has the best signal-to-noise ratio. This addition or combination is effected by applying the two diversity signals to the respective inputs of two combiner tubes having a common output, and by applying a separate negative bias to each respective tube which is proportional to the noise in the corresponding diversity signal. The combiner tube circuit is arranged so that the sum of the current in both (or all) combiner tubes is constant, but the current in each tube fluctuates as current is continuously being transferred from one to the other, in response to varying noise-responsive biases. Thus, the combiner tubes are intermittently operated. In an arrangement of this type, the automatic reporting of failure of a single combiner tube proves difficult, since if one tube fails the total current is carried by the other. During a failure of a combiner tube there is no interruption of received signal, but there is a loss in diversity operation that may be unnoticed for a considerable time. A simple measurement of tube current is not sufficient as a basis for a tube failure report, since even in normal operation the tubes are intermittently operating.

Previously, such tube failures were detected by means of a routine checking of the communication system, involving deliberate interruption of one path of the diversity system at a time, to produce a failure report from a faulty relay station in a relaying system. This "interrogation" method has several distinct disadvantages, among which are: (1) it requires a considerable amount of extra circuitry in the system; (2) there is a risk of total interruption of the system at the moment of interrogation, which is very objectionable to users of the system; and (3) there may be an excessive delay between the occurrence of the failure and the report thereof, resulting in a prolonged period of inferior transmission.

An object of this invention is to provide an improved, simplified failure detection circuit for intermittently operated tubes.

Another object is to provide a novel tube failure detection circuit, which gives an immediate report of a tube failure, and with which there is no danger of total interruption of the system.

The objects of this invention are accomplished, briefly, in the following manner: by means of a diode circuit arrangement, the bias (or unidirectional control) voltages applied to the respective grids of the combiner tubes are compared, and the most positive one of these voltages is isolated and translated to a measuring point. This (most positive) control voltage is compared with the voltage at the common cathode (output) connection of all the combiner tubes, and when (in response to a tube failure) the cathode voltage approaches the most positive control voltage, a direct current amplifier is operated in such a manner that a positive voltage is produced at the said measuring point. This positive voltage is utilized to report the failure, and is also used to lock in the direct current amplifier (positive-voltage-producing) circuit.

A detailed description of the invention follows, taken in conjunction with the accompanying drawing, wherein the single figure is a combination block and schematic diagram of a tube failure detection circuit according to this invention.

The present invention is capable of being used in a microwave relaying system employing frequency or space diversity operation. For such diversity operation, the same information is received on two different receivers, antennas being separated by a distance (space diversity) or frequencies being separated by a distance (frequency diversity) sufficient to make the fading on the two receivers enough uncorrelated to provide good diversity operation.

At a radio receiving station, such as a relay station or a terminal station, the two microwave signals are received, separately amplified, demodulated or detected, and then applied respectively to the inputs of two baseband amplifiers No. 1 and No. 2. These baseband amplifiers respectively amplify the original modulation signal frequency band as transmitted and received over the two separate transmission paths, arranged as described in frequency diversity.

The output of baseband amplifier No. 1, which corresponds to one of the diversity signal channels, is fed in part to a high pass filter 1, which has a lower cut-off frequency above the highest frequency in the baseband and has an attenuation sufficient to reduce the baseband signals to a level where at all times the energy contribution from this source becomes small in comparison to the energy contributed by the system noise. This filter passes only noise above baseband frequencies, and the filter output is fed to a noise amplifier and rectifier unit 2. In unit 2, the noise is amplified and rectified to provide a direct current output which is negative in polarity and which is a function of the noise level in receiver No. 1, that is, in the first diversity channel. Part of the direct current output of unit 2 is filtered and fed back to the grids of tubes in the noise amplifier 2, by means of an AGC loop 40. This will tend to lower the amplification of these tubes as the noise increases, thus giving the amplifier a desired logarithmic amplification characteristic. The D.C. output of unit 2 then becomes a linear function of the noise input to filter 1, when the latter is expressed in decibels. The direct current output of unit 2 is applied by way of a resistor 3 to the grid 4 of a triode vacuum tube or electron discharge device 5, which is the first combiner tube. The direct current output of unit 2 serves as a unidirectional control voltage for operation of combiner tube 5, in such a way that the current through this tube is governed by the level or magnitude of this (negative) control voltage. Thus, as the control voltage varies, the current through tube 5 varies correspondingly.

The baseband signal from baseband amplifier No. 1 is also fed by way of a coupling capacitor 6 to the grid 4 of tube 5.

The output of baseband amplifier No. 2, which corresponds to the other of the diversity signal channels, is fed in part to a high pass filter 1' which is similar to filter 1. Filter 1' passes only noise above baseband frequencies, and the output of this filter is fed to a noise amplifier and rectifier unit 2' which is similar to unit 2. In unit 2', the noise is amplified and rectified to provide a direct current output which is negative in polarity and which is a function of the noise level in receiver No. 2, that is, in the second diversity channel. An AGC loop 40', similar to loop 40, is provided for unit 2'. This loop 40' functions exactly similarly to loop 40, previously described. The direct current output of unit 2' is applied by way of a resistor 3' to the grid 4' of a triode vacuum tube or electron discharge device 5', which is the second combiner tube. The direct current output of unit 2' serves as a unidirectional control voltage for operation of combiner tube 5', in such a way that the current through this tube is governed by the level or magnitude of this (negative) control voltage. Thus, as the control voltage output of unit 2' varies, the current through tube 5' varies correspondingly.

The baseband signal from baseband amplifier No. 2 is also fed by way of a coupling capacitor 6' to the grid 4' of tube 5'.

The anode 7 of tube 5 and the anode 7' of tube 5' are connected together and to the positive terminal +250 v. of a suitable power supply. The cathode 8 of tube 5 and the cathode 8' of tube 5' are connected together at point B and through a common resistor 9 to the negative terminal −200 v. of a suitable power supply. In a practical embodiment, the resistor 9 may be a parallel combination of three resistors, but only one is shown for purposes of simplicity. The arrangement of tubes 5 and 5', connected as above described, is a very stable cathode follower circuit, where the total current carried in the two tubes (that is, the sum of the currents in the two tubes) is substantially constant for variations in grid voltage levels. Therefore, the overall gain is always very nearly unity. The tubes 5 and 5' can both conduct at the same time.

The combined baseband signal output of tubes 5 and 5', appearing across the common resistor 9, is taken off at point B and applied through a coupling capacitor 10 to a common load, for example the input of another (single) baseband amplifier.

Although the total current carried by the tubes 5 and 5' is substantially constant, the relative unidirectional control voltages (from units 2 and 2', applied respectively to grids 4 and 4') applied to the grids of the two tubes will determine the part of the total current carried by each tube. Thus, the tubes are intermittently operated. Since the transconductance is very nearly proportional to the tube current, the relative unidirectional control voltages will also determine the part of the combined baseband signal which is received from or contributed by each tube (that is, from each diversity channel). As previously described, the combined baseband signal appears at point B and is taken off for utilization via capacitor 10.

The proportion of the total current carried by each of the tubes 5 and 5' is a function of the noise content in the two diversity signals. Thus, if the noise level from diversity receiver No. 1 is higher than that from diversity receiver No. 2, the negative direct current potention applied to grid 4 will be higher than the negative potential applied to grid 4', and tube 5' will draw the larger anode current. The signal contribution (in the common load or output circuit) from receiver No. 2 will then be larger than that from receiver No. 1. The noise in the two diversity channels, however, is uncorrelated and will partly cancel in the common output, and with correct setting of the noise amplifiers (in units 2 and 2') the total noise at the common cathodes (which is point B) will be lower than the noise in the better of the two diversity receivers. Since the total signal output is always constant, the signal-to-noise ratio will improve in the same way.

The magnitudes of both of the control voltages are sampled, and only a voltage equal to the more positive one thereof is translated to a point A. In order to do this, a semiconductor diode 11 has its anode connected to the "out" lead of unit 2 (on which lead the negative control voltage for diversity channel No. 1 appears), and its cathode (denoted by the symbol K) connected to a bus 12 on which point A is located. Also, a semiconductor diode 13 has its anode connected to the "out" lead of unit 2' (on which lead the negative control voltage for diversity channel No. 2 appears), and its cathode (denoted by the symbol K) connected to bus 12 and point A.

If point A is positive with respect to any one control voltage (for example, with respect to the control voltage from unit 2'), diode 13 will provide a high resistance (since its cathode is then positive with respect to its anode, and it is as a result biased in the reverse or nonconducting direction), thus preventing the flow of current from point A to this control voltage source 2'.

Point A cannot become more positive than the most positive control voltage. This may be seen from the following. The diodes 11 and 13 can be considered as potential-responsive or potential-varying resistances. Assuming that the voltage at the output of unit 2 is positive with respect to that at the output of unit 2' and is therefore also the more positive control voltage, point A becomes the junction point in a circuit comprising a very low resistance (diode 11 biased in the forward or conducting direction) between point A and control voltage source No. 1 (output of unit 2), and a very high resistance (diode 13 biased in the reverse or nonconducting direction) between point A and control voltage source No. 2 (output of unit 2'). It should be apparent that in such a circuit, point A cannot become more positive than source No. 1 (output of unit 2).

If point A becomes negative with respect to any one control voltage (for example, with respect to the voltage from control voltage source No. 2), diode 11 (having its cathode negative with respect to its anode) provides a low resistance, thus allowing current to flow from control voltage source No. 2 to point A. A potential equalization will take place; hence point A cannot become more negative than the most positive of the control voltages applied to the combiner tubes.

Since point A cannot become more positive than the most positive control voltage and cannot become more negative than the most positive control voltage, and since when this point is positive with respect to either one of the control voltages (but not, of course, with respect to the other) it is effectively isolated from such one control voltage with respect to which it is positive, it necessarily follows that point A has a voltage equal to the more positive one of the two control voltages. Thus, in effect, the magnitudes of the two control voltages are sampled (by means of the diode circuit described), and only a voltage equal to the more positive of the two control voltages is translated to point A.

According to this invention, the grid potential of the combiner tube 5 or 5' having the more positive grid potential (which potential, as previously described, appears at point A) is compared with the potential of the cathode, the latter being common for both (or all) combiner tubes, and appearing at point B. In order to effect such comparison, point A is connected directly to the grid 14 of the triode vacuum tube or electron discharge device 15 connected to act as a control tube, or as the first stage of a two-stage direct current amplifier. Point B is connected through a resistor 16 (for signal frequency isolation) to the cathode 17 of tube 15. The anode 18 of tube 15 is connected through a resistor 19 to the positive terminal +250 v. of the power supply, while anode 18 is also connected through a variable resistor 20 to the grid 21 of a triode vacuum tube 22 connected as the second stage of the direct current amplifier. The cathode 23 of discharge device 22 is grounded, while the anode 24 of this device is connected through a resistor 25 to the positive terminal of the power supply. The anode 24 is connected through a resistor 26 to point C, while a resistor 27 is connected from this latter point to the −200 v. power supply. A resistor 28 is connected from grid 21 to this same negative power supply. Point C is connected through a switch 29 (normally closed during operation of the system, but shown as open for purposes of clarity) to the anode of a diode 30, and the cathode K of this latter diode is connected to bus 12 and thereby also to point A.

During proper operation of the combiner tubes 5 and 5', the cathode potential at point B is some few volts higher than the more positive of the combiner tube grids, and is sufficient to cut off tube 15 when the cathode 17 is connected to point B and the grid 14 is connected to point A. In this state, grid 21 is at ground potential, as determined by the voltage divider action of resistors 19, 20, and 28, and the grid current of tube 22. Tube 22 is then fully conducting, causing the voltage at anode 24 to stay far below the B+ potential (which latter is 250 volts). Resistors 26 and 27 are chosen to give a negative potential at point C, a potential more negative than the most negative possible control voltage on the combiner tube grids.

In the previous discussion regarding the impossibility of the potential at point A becoming more positive than the most positive control voltage, it was tacitly assumed that switch 29 was open, so that bus 12 was not connected through diode 30 to point C. Even if switch 29 is closed, as it is during normal operation, the said impossibility still holds. Point C is adjusted (by means of variable resistor 20) to be at a negative potential (—30 volts, approximately) as long as tube 22 is conducting. Thus, the potential at point C will not interfere with the potential at point, A since this potential of —30 volts (applied to the anode of diode 30) is more negative than the most negative possible control voltage (which control voltage may be applied to the cathode of diode 30).

As previously described, the arrangement of this invention compares the more positive one of the control voltages with the potential of the cathodes. The principle which underlies the tube failure detection circuit of this invention is that whenever the cathode potential of any tube approaches too closely the most positive control voltage, that tube is not performing its proper function of cathode following, due to loss of emission. Such a loss of emission results of course in a deterioration in the tube transconductance. This voltage discrepancy is detected according to the invention and the information is locked in to provide a continuous tube failure report, despite random variations in grid voltages on the combiner tubes. This will now be explained in more detail.

As previously described, the point A has a potential equal to the more positive of the two control voltage applied to tubes 5 and 5', respectively. If control voltage No. 1 (from unit 2) is more positive than control voltage No. 2 (from unit 2'), tube 5 will take the bulk of the total combiner tube current. Due to the high negative voltage applied by way of resistor 9, the tube current of tube 5 will settle at the proper operating point of grid-cathode voltage vs. anode current, determined solely by the tube transconductance and the anode-cathode voltage. Since the latter is always very nearly constant (in practice, it may vary between 245 and 275 volts), the tube transconductance is the only determining factor.

Now, if the tube transconductance slowly deteriorates, the following will happen. The grid voltage will stay constant, being determined only by the output of unit 2. The tube current cannot change materially, because the circuit is such that the sum of the currents in tubes 5 and 5' is substantially constant. The anode-cathode potential will not change. However, forced by the lowering in transconductance, the tube will adjust its grid-cathode voltage by a slight drop in the cathode current until proper voltage-current balance is restored in the tube. In this adjustment, the cathode potential will approach that of the grid. In cases of increased deterioration of tube transconductance, the potential gap (between cathode and grid potentials) will be further closed, until at some point the tube loses control and the cathode potential (at point B) suddenly drops down to a level determined by the grid potential of the tube 5'. At some point in this process, the potential gap between the cathode 17 and the grid 14 of tube 15 will close sufficiently to bring about conduction in this latter tube (15), it being remembered that this latter tube (15) is normally cut off by the potential at point B (the cathode potential) being some few volts higher than the more positive of the combiner tube grids (the potential at point A).

The above operation may also be explained in the following way. When a combiner tube (5 or 5') loses its transconductance and the control voltage on that tube becomes less negative and reaches a potential where the tube should normally have started conducting, the potential at point B will approach the potential at A, and tube 15 will start conducting. The conduction in tube 15 can be brought about only by a tube failure (deterioration in transconductance) in a combiner tube. The voltage at anode 18 will then drop, causing the potential at grid 21 to drop. Tube 22 will stop conducting, and the potential at point C (coupled to the anode 24 of tube 22) will rise to a moderate positive value, due to the rise of the potential at anode 24 to a value near +250 volts. The direct current amplification in the circuit including tubes 15 and 22 will make the rise of potential at point C very abrupt. When the potential at point C exceeds the original potential at point A, the original bias on diode 30 will be overcome. Then, the positive potential at point C will be transferred through diode 30 back to point A and to grid 14, locking tube 15 in its conducting state. The circuit will stay thus locked until it is released by removing the cause of original conduction of tube 15 (that is, by replacing the failed tube), and breaking the direct current feedback path by opening switch 29.

The positive voltage thus produced at point A, in response to tube failure, will be isolated from tubes 5 and 5' by the action of diodes 11 and 13, which then have a high resistance (due to the voltage at their cathodes being positive with respect to that at their anodes), thus preventing current flowing from point A to the control voltage sources or the combiner tubes.

The positive voltage produced at point A, in response to tube failure, is detected by a potential sensing circuit, now to be described, which controls a relay reporting the tube failure to the system fault reporting unit.

Point A is connected through a resistor 31 to the first grid 32 of a double or twin triode vacuum tube 33 connected to operate as a D.C. operated flip-flop circuit. The two cathodes of tube 33 have a common cathode resistor 34, and the anode 35 of the first triode section is connected to the grid 36 of the second triode section through a resistor 37. The arrangement is such that the second triode section of tube 33 (controlled by grid 36) is normally conducting, with the first triode section (including electrodes 32 and 35) normally cut off, but the circuit is flipped over (cutting off the second triode section) in response to a moderate positive voltage appearing at point A, and applied to grid 32.

The winding of a relay 38 is connected into the anode circuit of the second triode section of tube 33, and since this triode section is normally conducting, relay 38 is normally energized, and it is so illustrated. Relay 38 includes a pair of normally-open contacts 39 which are adapted to be closed when the flip-flop circuit is flipped over to cut off the second triode section and deenergize relay 38. The contact pair 39 is connected to a fault reporting device (not shown), and it is arranged that the closing of this contact pair will initiate a fault report. In a practical embodiment, the closing of contacts 39 may short-circuit another relay which is normally energized. This other relay will in turn close its normally-open contacts, to which the said fault reporting device is connected.

The tube failure detection circuit of this invention is adapted to be used in a microwave relay system, and particularly at relay stations thereof which may be unattended. It is most important that a fault in the system be reported automatically and immediately, and the arrangement of this invention functions to make an immediate and automatic report of diversity combiner tube failures. In an actual system, the fault report produced by the arrangement of the invention is pooled with the fault reports from various other tubes, in all about forty tubes for a terminal station and sixty tubes for a repeater or relay station. The report is transmitted over a remote fault report system, and the purpose is to call a serviceman to the radio site. By systematic measurements, the serviceman then locates the fault.

Although this invention has been illustrated and described in connection with a diversity system using only two combiner tubes, this has been done only for purposes of simplicity. Actually, the arrangement of the invention is applicable to three, or even more, combiner tubes. If another combiner tube in addition to the two illustrated were utilized, a baseband signal would be applied to its grid, along with a control voltage, and a diode (similar to diodes 11 and 13) would be connected from the third control voltage source to bus 12, the cathode of this additional diode being connected to bus 12.

The following typical values for certain of the circuit components are given by way of example. These were the values used in an arrangement according to this invention which was built and successfully tested.

| | |
|---|---|
| Tube **5** | 5965. |
| Tube **5'** | 5965. |
| Diode **11** | 1N34A. |
| Diode **13** | 1N34A. |
| Tube **15** | ½ 12AX7. |
| Tube **22** | ½ 12AX7. |
| Diode **30** | 1N457. |
| Capacitor **6** | .01 mfd. |
| Capacitor **6'** | .01 mfd. |
| Capacitor **10** | .01 mfd. |
| Resistor **3** | 147,000 ohms. |
| Resistor **3'** | 147,000 ohms. |
| Resistor **9** | 18,666 ohms. |
| Resistor **16** | 27,000 ohms. |
| Resistor **19** | 150,000 ohms. |
| Resistor **20** | 33,000 to 580,000 ohms (variable). |
| Resistor **25** | 100,000 ohms. |
| Resistor **26** | 560,000 ohms. |
| Resistor **27** | 680,000 ohms. |
| Resistor **28** | 560,000 ohms. |

What is claimed is:

1. In a failure detection circuit for a plurality of electron discharge devices the sum of the currents through which is substantially constant but the current through each of which is subject to variation in accordance with a respective control voltage applied thereto: means receptive of said control voltages and of the voltage at a common output connection of said devices for producing a control effect in response to a deterioration in the transconductance of any if said devices, and means for utilizing said control effect to produce a predetermined voltage indicative of device failure.

2. In a failure detection circuit for a plurality of electron discharge devices the sum of the currents through which is substantially constant but the current through each of which is subject to variation in accordance with a respective control voltage applied thereto: means acted upon by the most positive one of said control voltages for producing a control effect in response to a deterioration in the transconductance of any of said devices, and electronic means responsive to said control effect to produce a predetermined voltage indicative of device failure.

3. In a failure detection circuit for a plurality of electron discharge devices the sum of the currents through which is substantially constant but the current through each of which is subject to variation in accordance with a respective control voltage applied thereto: means receptive of said control voltages and of the voltage at a common output connection of said devices for producing a control effect in response to a deterioration in the transconductance of any of said devices, and a direct current amplifier receptive of said control effect and operating to produce a predetermined output voltage indicative of device failure.

4. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, and means receptive of said control voltages and of the voltage at a common output connection of said devices for producing a control effect in response to a deterioration in the transconductance of any of said devices.

5. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, and means acted upon by the most positive one of said control voltages for producing a control effect in response to a deterioration in the transconductance of any of said devices.

6. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, means receptive of said control voltages and of the voltage at a common output connection of said devices for producing a control effect in response to a deterioration in the transconductance of any of said devices, and means for utilizing said control effect to produce a predetermined voltage indicative of device failure.

7. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, means acted upon by the most positive one of said control voltages for producing a control effect in response to a deterioration in the transconductance of any of said devices, and means for utilizing said control effect to produce a predetermined voltage indicative of device failure.

8. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, means receptive of said control voltages and of the voltage at a common output connection of said devices for producing a control effect in response to a deterioration in the transconductance of any of said devices, and a direct current amplifier receptive of said control effect and operating to produce a predetermined output voltage indicative of device failure.

9. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, means for applying a separate signal to be translated to each respective control electrode, means coupling the outputs of said devices together and to a common load, and means receptive of said control voltages and of the voltage appearing at said load for producing a control effect in response to a deterioration in the transconductance of any of said devices.

10. In a failure detection circuit for a plurality of electron discharge devices the sum of the currents through which is substantially constant but the current through each of which is subject to variation in accordance with a respective unidirectional control voltage applied thereto, said devices each having a control electrode: means for applying each control voltage to a respective control electrode, means for applying a separate signal to be translated to each respective control electrode, means coupling the outputs of said devices together and to a common load, means acted upon by the most positive one of said control voltages for producing a control effect in response to a deterioration in the transconductance of any of said devices, and means for utilizing said control effect to produce a predetermined voltage indicative of device failure.

11. In a failure detection circuit for a plurality of electron discharge devices the sum of the currents through which is substantially constant but the current through each of which is subject to variation in accordance with a respective unidirectional control voltage applied thereto, said devices each having a control electrode and a cathode: means for applying each control voltage to a respective control electrode, means coupling the cathodes of all of said devices together, means for sampling the magnitudes of all of said control voltages and for translating only a voltage equal to the most positive one thereof, and means for comparing said translated voltage with the common cathode potential of said devices and for producing a control effect in response to the close approach by said cathode potential to said translated voltage.

12. In a failure detection circuit for a plurality of electron discharge devices the sum of the currents through which is substantially constant but the current through each of which is subject to variation in accordance with a respective unidirectional control voltage applied thereto, said devices each having a control electrode and a cathode: means for applying each control voltage to a respective control electrode, means coupling the cathodes of all of said devices together, means for sampling the magnitudes of all of said control voltages and for translating only a voltage equal to the most positive one thereof, means for compairing said translated voltage with the common cathode potential of said devices and for producing a control effect in response to the close approach by said cathode potential to said translated voltage, and means for utilizing said control effect to produce a predetermined voltage indicative of device failure.

13. In a failure detection circuit for a plurality of electron discharge devices the sum of the currents through which is substantially constant but the current through each of which is subject to variation in accordance with a respective unidirectional control voltage applied thereto, said devices each having a control electrode and a cathode: means for applying each control voltage to a respective control electrode, means for applying a separate signal to be translated to each respective control electrode, means coupling the cathodes of all of said devices together and to a common load, means for sampling the magnitudes of all of said control voltages and for translating only a voltage equal to the most positive one thereof, and means for comparing said translated voltage with the common cathode potential of said devices and for producing a control effect in response to the close approach by said cathode potential to said translated voltage.

14. In a failure detection circuit for a plurality of electron discharge devices the sum of the currents through which is substantially constant but the current through each of which is subject to variation in accordance with a respective unidirectional control voltage applied thereto, said devices each having a control electrode and a cathode: means for applying each control voltage to a respective control electrode, means coupling the cathodes of all of said devices together, means for sampling the magnitudes of all of said control voltages and for translating only a voltage equal to the most positive one thereof, means for comparing said translated voltage with the common cathode potential of said devices and for producing a control effect in response to the close approach by said cathode potential to said translated voltage, and a direct current amplifier receptive of said control effect and operating to produce a predetermined output voltage indicative of device failure.

15. In a failure detection circuit for a plurality of electron discharge devices the sum of the currents through which is substantially constant but the current through each of which is subject to variation in accordance with a respective unidirectional control voltage applied thereto, said devices each having a control electrode and a cathode: means for applying each control voltage to a respective control electrode, means for applying a separate signal to be translated to each respective control electrode, means coupling the cathodes of all of said devices together and to a common load, means for sampling the magnitudes of all of said control voltages and for translating only a voltage equal to the most positive one thereof, means for comparing said translated voltage with the common cathode potential of said devices and for producing a control effect in response to the close approach by said cathode potential to said translated voltage, and a direct current amplifier receptive of said control effect and operating to product a predetermined output voltage indicative of device failure.

16. In combination, a plurality of electron discharge devices each having at least a control electrode and a cathode; means for applying a separate unidirectional control voltage to each respective control electrode, a diode individual to each discharge device, means coupling like electrodes of each of said diodes separately to the respective control electrodes, means connecting the remaining electrodes of all of said diodes together, means coupling the cathodes of all of said devices together, and means for comparing the common potential of said remaining diode electrodes with the common cathode potential of said devices and for producing a control effect in response to the close approach by said cathode potential to the diode electrode potential being compared therewith.

17. In combination, a plurality of electron discharge devices each having at least a control electrode and a cathode; means for applying a separate unidirectional control voltage to each respective control electrode, a diode individual to each discharge device, means coupling like electrodes of each of said diodes separately to the respective control electrodes, means connecting the remaining electrodes of all of said diodes together, means coupling the cathodes of all of said devices together, and means for comparing the common potential of said remaining diode electrodes with the common cathode potential of said devices and for producing a control effect in response to the close approach by said cathode potential to the diode electrode potential being compared therewith, said last-named means comprising a direct current amplifier, and means for applying the two potentials being compared to the input of said amplifier.

18. In combination, a plurality of electron discharge devices each having at least a control electrode and a cathode; means for applying a separate unidirectional control voltage to each respective control electrode, a diode individual to each discharge device, means coupling the anode of each of said diodes separately to a respective control electrode, means connecting the cathodes of all of said diodes together, means coupling the cathodes of all of said devices together, a direct current amplifier, and means applying the common cathode potential of said devices and also the common potential of said diode cathodes to the input of said amplifier.

19. In combination, a plurality of electron discharge devices each having at least a control electrode and a cathode; means for applying a separate unidirectional control voltage to each respective control electrode, a diode individual to each discharge device, means coupling like electrodes of each of said diodes separately to the respective control electrodes, means connecting the remaining electrodes of all of said diodes together, means coupling the cathodes of all of said devices together, a direct current amplifier, means applying the common potential of said remaining diode electrodes and also the common cathode potential of said devices to the input of said amplifier, and a diode coupled between the output of said amplifier and the common connection of said remaining diode electrodes.

20. In combination, a plurality of electron discharge devices each having at least a control electrode and a cathode; means for applying a separate unidirectional control voltage to each respective control electrode, a diode individual to each discharge device, means coupling the anode of each of said diodes separately to a respective control electrode, means connecting the cathodes of all of said diodes together, means coupling the cathodes of all of said devices together, a direct current amplifier, means applying the common cathode potential of said devices and also the common potential of said diode cathodes to the input of said amplifier, and a diode having its anode coupled to the output of said amplifier and its cathode connected to the common connection of said diode cathodes.

21. A failure detection circuit for a plurality of current conducting devices each having at least a first and second electrode comprising, means for applying a separate control voltage to each respective first electrode, means to connect the second electrodes of all of said devices together, and means coupled to said first-mentioned means and to the common connection of the second electrodes of all of said devices, said last-mentioned means being receptive of said control voltages and of the common second electrode potential of said devices for producing a control signal in response to deterioration in the transconductance of any of said devices.

22. A failure detection circuit as claimed in claim 21 and wherein said input electrodes are each coupled to a separate signal source, means coupled between said sources and said first-mentioned means for deriving said control voltages as a function of the noise included in the signals supplied by said sources.

23. In a failure detection circuit for a plurality of current conducting devices the sum of the currents through which is substantially constant but the current through each of which is subject to variation in accordance with a respective control voltage applied thereto; means having an input coupled to a common output of said devices and receptive of said control voltages for producing a control effect in response to a deterioration in the transconductance of any of said devices, and means responsive to said control effect to produce an output signal indicative of device failure.

24. In combination, a plurality of current conducting devices each having at least an input and output electrode, means for applying a separate control voltage to each respective input electrode, a plurality of diodes equal in number to the number of said devices, means coupling like electrodes of each of said diodes separately to the respective input electrodes, means connecting the remaining electrodes of all of said diodes together, means connecting the output elecrodas of all of said devices together, a direct current amplifier, means to apply the common potential of said remaining diode electrodes and to apply the common output electrode potential of said devices to the input of said amplifier, and a diode having an electrode corresponding to said like electrodes coupled to the output of said amplifier and having the remaining electrode thereof connected to the common connection of the remaining electrodes of said plurality of diodes.

References Cited in the file of this patent

UNITED STATES PATENTS

| | | |
|---|---|---|
| 2,547,011 | Jacobsen | Apr. 3, 1951 |
| 2,803,703 | Sherwin | Aug. 20, 1957 |
| 2,835,799 | Day | May 20, 1958 |